(12) United States Patent
Frankenberger et al.

(10) Patent No.: US 8,711,339 B2
(45) Date of Patent: Apr. 29, 2014

(54) SPECTRAL SENSOR FOR CHECKING DOCUMENTS OF VALUE

(75) Inventors: Jorg Frankenberger, Markt Schwaben (DE); Wolfgang Deckenbach, Schechen (DE); Wolfgang Rauscher, Parkstetten (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 13/516,101

(22) PCT Filed: Dec. 16, 2010

(86) PCT No.: PCT/EP2010/007704
§ 371 (c)(1),
(2), (4) Date: Jun. 14, 2012

(87) PCT Pub. No.: WO2011/072863
PCT Pub. Date: Jun. 23, 2011

(65) Prior Publication Data
US 2012/0293790 A1    Nov. 22, 2012

(30) Foreign Application Priority Data
Dec. 18, 2009 (DE) .......................... 10 2009 058 805

(51) Int. Cl.
*G06K 9/74* (2006.01)
*G06K 9/00* (2006.01)

(52) U.S. Cl.
CPC .................................. *G06K 9/00046* (2013.01)
USPC ............................................................ 356/71

(58) Field of Classification Search
CPC ............................ G06K 9/74; G06K 9/00046

USPC ............................................................ 356/71
See application file for complete search history.

(56) References Cited

U.S. PATENT DOCUMENTS

| 5,498,879 | A | | 3/1996 | De Man |
| 5,757,001 | A | * | 5/1998 | Burns ...................... 250/339.11 |

(Continued)

FOREIGN PATENT DOCUMENTS

| DE | 102 39 225 A1 | 3/2004 |
| DE | 10 2005 029 119 A1 | 12/2006 |

(Continued)

OTHER PUBLICATIONS

International Search Report for PCT/EP2010/007704, Apr. 4, 2011 (3 pages).

(Continued)

*Primary Examiner* — Michael P Stafira
(74) *Attorney, Agent, or Firm* — Workman Nydegger (57) ABSTRACT

A spectral sensor for inspecting value documents, includes an illumination device for illuminating the value document, imaging optics and a detection device. The illumination device contains a plurality of light sources with emission spectra that differ from one another, and which are switched on and off in succession, to illuminate a region of the value document with an illumination sequence consisting of light pulses with different emission spectra. One measured value is detected for each of the light pulses to record the spectral intensity distribution of the detected light. The plurality of light sources cover a section of the near infra-red spectral range and/or a section of the visible spectral range in such a way that the spectral sensor can record a spectral intensity distribution in the section of the near infra-red spectral range and/or in the section of the visible spectral range.

15 Claims, 4 Drawing Sheets

(56) References Cited

U.S. PATENT DOCUMENTS

| | | |
|---|---|---|
| 7,067,824 B2 * | 6/2006 | Muller et al. .............. 250/458.1 |
| 2004/0021064 A1 | 2/2004 | Baudat |
| 2008/0259314 A1 | 10/2008 | Kamijo |
| 2009/0224694 A1 | 9/2009 | Horing et al. |

FOREIGN PATENT DOCUMENTS

| | | |
|---|---|---|
| DE | 20 2007 013 090 U1 | 1/2008 |
| EP | 1 953 709 A1 | 8/2008 |
| GB | 1 470 737 | 4/1977 |
| GB | 2 366 371 A | 3/2002 |

OTHER PUBLICATIONS

German Search Report for German application No. 10 2009 058 805.1, Nov. 8, 2010 (4 pages).

* cited by examiner

SPECTRAL SENSOR FOR CHECKING DOCUMENTS OF VALUE

BACKGROUND OF THE INVENTION

A. Field of the Invention

The invention relates to a spectral sensor for checking documents of value and a method for checking documents of value with the help of the spectral sensor.

B. Related Art

For checking documents of value there are usually employed sensors with which the type of the documents of value is determined and/or with which the documents of value are checked for authenticity and/or their state. Such sensors are employed for checking documents of value such as e.g. bank notes, checks, identity documents, credit cards, check cards, tickets, vouchers and the like. The check of the documents of value is effected in an apparatus for processing documents of value in which one or several different sensors are contained, depending on the properties of the documents of value to be checked. Upon checking, the documents of value are usually scanned by the sensor, whereby the sensor and the document of value are moved relative to each other.

With a multiplicity of sensors, the documents of value are illuminated with light sources of certain colors, in order to ascertain from the remission of the documents of value for these colors the visually visible color of the document of value. Corresponding to the three different color receptors of the human eye, these sensors have only three color channels which are realized e.g. by red, green and blue light-emitting diodes (RGB sensors). With such optical sensors which have only three color channels, however, no spectral intensity distribution of the light emanating from the document of value can be recorded.

For recording a spectral intensity distribution, there are known spectral sensors which illuminate the documents of value with white light and detect in spectrally resolved fashion the light remitted by the documents of value. With such spectral sensors, there is employed a diffraction grating for the spectral splitting of the light remitted by the documents of value. The spectral splitting, however, requires a relatively long ray path from the diffraction grating to the detector line, so that such spectral sensors need a large installation space. Furthermore, the spectral range which can be captured with such a spectral sensor is relatively narrow, so that no spectral intensity distribution over a wide spectral range can be recorded therewith. Because the diffraction gratings are optimized for a certain wavelength, so that the reflection coefficient of the grating for the light of this wavelength is as great as possible. For wavelengths deviating therefrom, however, there occurs a strong drop in the reflection coefficient of the diffraction grating, so that of the light of these wavelengths only very low light intensities are available for the detection.

SUMMARY OF THE DISCLOSURE

It is therefore an object of the present invention to provide an improved spectral sensor for checking documents of value, which can record from one or more regions of a document of value a spectral intensity distribution in the visually visible spectral range and/or in the near-infrared spectral range.

The spectral sensor has an illumination device for illuminating the document of value to be checked by the spectral sensor, an imaging optic and a detection device. The illumination device has a multiplicity of light sources, whose emission spectra are different from each other. The emission spectra of these light sources lie in the visually visible spectral range and/or in the near-infrared spectral range. The imaging optic images the light emitted by the illumination device onto a region of the document of value to be checked. Through the imaging optic it is achieved that a clearly defined and spatially limited region of the document of value to be checked can be illuminated. The detection device is configured for detecting the light which, upon the operation of the spectral sensor, emanates from the illuminated region when the document of value is illuminated by the illumination device.

The illumination device of the spectral sensor has a multiplicity of different light sources, whose emission spectra are different from each other. Within the illumination device, the light sources can be arranged side by side, e.g. in a two-dimensional grid, in particular on a light source receiving means common to the light sources. The light sources can also be arranged annularly, e.g. around the detection device. The imaging optic is configured to image the emission light of each of the light sources onto a document of value to be checked. The light emitted by the illumination device is imaged by the imaging optic via a defined ray path onto the illuminated region of the document of value. The imaging optic has for this purpose e.g. one or several refractive optical elements (e.g. lenses) and/or diffractive and/or mirroring optical elements, which image the light emitted by the light sources onto the document of value. Preferably, the imaging optic is configured as an imaging lens. By an imaging of the illumination light onto the document of value being effected, the illuminated region of the document of value is clearly defined and spatially limited. This represents an advantage compared to a direct illumination of the document of value by the light sources (without any optic lying therebetween) and compared to a simple light guide optic (without imaging optic), by which the light is not imaged, but is brought without defined ray path from the light guide onto the document of value.

In order to image the light of the various light sources emitted by the illumination device largely onto the same illuminated region of the document of value, the imaging optic is preferably so arranged that the illuminated region of the document of value lies exactly or approximately in the focal point of the imaging optic. It can thereby be achieved that, despite the illumination of the document of value with different light sources arranged side by side, substantially the same region of the document of value to be checked can be illuminated and can be detected by the detection device. The imaging optic can be configured to illuminate a patchy region on the document of value, in particular a round illumination patch. But it can also be configured to illuminate a strip-shaped region on the document of value. As an imaging optic there can be employed in the first case e.g. a radially symmetric imaging optic and in the second case a cylindrical optic.

The light emitted by the light sources can be collected with the help of a collection optic which directs the collected light in a suitable manner onto the imaging optic and which can be a component of the illumination device. The light sources, the collection optic and the imaging optic are in this case arranged to each other such that the emission light of each of the light sources can be imaged by the collection optic and the imaging optic onto a document of value, which is to be checked by the spectral sensor upon the operation of the spectral sensor. The collection optic is arranged between the light sources and the imaging optic, in order to collect the light emitted by the light sources. The collection optic can be realized by a multiplicity of, e.g. refractive or diffractive, lenses arranged side by side, each of which collects the emission light of one of the light sources. The lenses of the collection optic and the imaging optic are arranged and configured here preferably such that the light sources are imaged in a blurred fashion onto the illuminated region of the document of value. It is furthermore preferred that each light source of the illumination device is less than the focal length of the lens apart from the lens assigned thereto. The lenses of the collection optic can be configured as single lenses or as microlenses of a microlens array.

In other embodiments the collection optic is formed by one or several light guides, which is or are arranged between the light sources and the imaging optic. Here, one common light guide for all light sources can be provided, or for each light source one separate light guide. The emission light of the light sources is coupled into the light guide or light guides and the light guide directs the emission light of the light sources to the imaging optic. The light exiting from the light guide is imaged by the imaging optic onto the document of value. As a light guide there can be employed e.g. a glass fiber or a light guide body with a round or strip-shaped light exit area.

The illumination device has a multiplicity of different light sources, whose emission spectra lie in the visually visible spectral range and/or in the near-infrared spectral range and are different from each other. That is, the multiplicity of light sources provide a multiplicity of different emission spectra, whose intensity maxima lie at different wavelengths. For example, each light source of the illumination device is configured for emitting an emission line of a certain wavelength, whose spectral position differs from the emission lines of all other light sources of the illumination device. Alternatively, however, the illumination device can also have several identical light sources, e.g. in order to obtain also in a spectral range with low-luminosity light sources a sufficient illumination intensity. Preferably, the multiplicity of light sources cover a section of the near-infrared spectral range such that the spectral sensor, by the detection of the measured values, can record a spectral intensity distribution in the section of the near-infrared spectral range. The light sources of the illumination device are e.g. so chosen that the spectral sensor can record a spectral intensity distribution in the near-infrared spectral range, which extends from the visually visible spectral range up into the near-infrared spectral range, for example from the visually visible spectral range up to at least a wavelength of 1000 nm, preferably up to at least a wavelength of 1200 nm. Alternatively or additionally, the multiplicity of light sources also cover a section of the visually visible spectral range such that the spectral sensor can record a spectral intensity distribution of the detected light in the section of the visually visible spectral range. The illumination device can also have one or several light sources, whose emission spectrum lies in the ultraviolet spectral range. As light sources there are preferably used light-eradiating diodes, for example light-emitting diodes (LED), in particular semiconductor light-emitting diodes or organic light-emitting diodes (OLED), and/or laser diodes, in particular vertical-cavity surface emitting lasers (VCSEL).

Upon the operation of the spectral sensor, the light sources are successively switched on and off, in order to illuminate a region of the document of value with an illumination sequence of light pulses with different emission spectra. The detection device is configured for detecting the light which, upon the operation of the spectral sensor, emanates from the region of the document of value which is illuminated with the illumination sequence. In so doing, for each of the light pulses of the illumination sequence a measured value is detected, in order to record a spectral intensity distribution of the detected light. The detected measured values respectively correspond to the light intensity which is detected upon the illumination with one of the light pulses of the illumination sequence. The spectral intensity distribution of the detected light is derived from the detected measured values.

For checking the document of value, the illumination sequence is periodically repeated: At least over a partial region of the document of value to be checked, the document of value is illuminated by the same illumination sequence. In other partial regions, the document of value can be illuminated by a different illumination sequence. The illumination sequences can be chosen here in dependence on the document of value to be checked. Already from the measured values which are detected during one single illumination sequence there can be ascertained a spectral intensity distribution of the light emanating from the document of value. Alternatively, however, it is also possible that measured values of the different illumination sequences are combined, preferably measured values of at least two consecutive illumination sequences. For example, at least two measured values which are detected upon the illumination with the same light source in consecutive illumination sequences are combined to one resulting measured value.

Upon the operation of the spectral sensor, the documents of value to be checked are transported with a transport speed past the spectral sensor. Preferably, the illumination sequence is of a duration which is so adjusted to the transport speed of the document of value to be checked that all light pulses emitted during the illumination sequence by the light sources illuminate almost the same region of the document of value. In particular, the region of the document of value illuminated by the first light pulse of the illumination sequence and the region of the document of value illuminated by the last light pulse of the same illumination sequence have an overlap of at least 75%. This means that for all light pulses of the same illumination sequence the areas of the illuminated regions, which are successively illuminated by these light pulses, are identical to at least 75%, in spite of the motion of the document of value during the illumination sequence.

Preferably, the spectral sensor is not configured for a full-area check of the document of value, but for a check of the document of value in one or several tracks on the document of value. In the case of a check in several tracks, between the tracks there are respectively arranged regions of documents of value which are not checked by the spectral sensor. The regions illuminated for the purpose of checking the document of value form tracks which extend mutually parallel and along the transport direction of the document of value. The tracks are discretely distributed on the document of value. For each of the tracks there is provided at least one illumination device, one imaging optic and one detection device in accordance with the above description. The illumination sequences preferably succeed one another so quickly that the document of value is checked along each of the tracks in quasi-continuous fashion.

The section of the near-infrared spectral range, which the light sources cover, comprises for example at least the wavelengths of 750 nm to 1000 nm and/or the wavelengths of 1000 nm to 1600 nm, optionally also wavelengths above 1600 nm. Preferably, the spectral sensor is equipped with light sources which cover the spectral range above 1000 nm. Because the spectral sensor can then, advantageously, also record a spectral intensity distribution in this long-wave spectral range, for which the hitherto usual spectral sensors, which employ silicon-based detectors, are not suitable. The section of the visually visible spectral range, which the light sources cover, can be e.g. the spectral range belonging to a certain color, e.g. the spectral range perceived by the human eye as red. The light sources, however, can also cover two or several colors, so that the spectral intensity distribution extends over two or several colors, e.g. over the green and the red spectral range. The emission spectra of the light sources of the illumination device comprise e.g. at least 5 different emission spectra in the visually visible spectral range. The section of the visually visible spectral range, which the light sources cover, however, can also be the entire visually visible spectral range.

The spectral sensitivity of the eye is based on only three color channels. Therefore, there exist colors which are different from each other, but in the human eye they trigger the same color impression. Such colors which have different spectral properties, but under the same illumination conditions look the same for humans, are referred to as metameric colors. Previous sensors which—like the human eye—have only three color channels, e.g. RGB sensors, cannot distinguish metameric colors from each other. The spectral sensor according to the invention, however, is configured to distinguish metameric colors. In the spectral sensor the emission spectra of the light sources are so chosen that metameric colors can be distinguished from each other based on the spectral intensity distributions recorded by the spectral sensor. For example, the spectral sensor can record for two metameric colors, which are contained on the same or on different documents of value, respectively one spectral intensity distribution, so that these can be compared with each other and their differences can be determined.

In the spectral sensor the emission spectra of the light sources are preferably so spectrally located that metameric colors, which can be contained in the illuminated region of the document of value, can be distinguished from each other based on the respective spectral intensity distribution which the spectral sensor can record upon detecting the light emanating from the metameric color. For example, the multiplicity of light sources cover the red spectral range and/or the green spectral range and/or the blue spectral range and/or the near-infrared spectral range of 750 nm to 1000 nm such that by the spectral sensor there can be distinguished the metameric colors from each other which can be contained in the illuminated region based on the spectral intensity distribution which the spectral sensor records upon detecting the light emanating from the metameric color. For distinguishing metameric colors whose optical properties differ within a certain color channel (e.g. red), it is advantageous to chose the light sources such that within the spectral range of this color channel there lie at least two different emission spectra of the light sources. To make it possible for the spectral sensor to distinguish many different metameric colors from each other, it is preferred to also cover further color channels (e.g. green, blue) through respectively at least two different emission spectra. The same applies to the differentiation of colors whose optical properties differ in the near-infrared spectral range. It is therefore preferred that the multiplicity of light sources cover the red spectral range and/or the green spectral range and/or the blue spectral range in such a way that in the respective spectral range there lie at least two different emission spectra of the light sources. With regard to the near-infrared spectral range it is preferred that the multiplicity of light sources cover the near-infrared spectral range of 750 nm to 1000 nm and/or the near-infrared spectral range of 1000 nm to 1600 nm in such a way that in the respective spectral range there lie at least three, preferably at least five, different emission spectra of the light sources.

In addition, it is preferred that the emission spectra of at least three, in particular of at least five, of the light sources, which are spectrally adjacent, spectrally overlap and/or have emission maxima respectively mutually different, whose spectral distance is no more than 60 nm. For example, each of the emission spectra of the light sources of the illumination device spectrally overlaps with at least one of the emission spectra of one of the other spectrally adjacent light sources of the illumination device.

The detection device preferably has a spectral sensitivity which is so spectrally broad-band that the emission light of each of the light sources of the illumination device is detectable by the detection device. In particular, the detection device is configured at least for the detection of light in the visually visible spectral range and for the detection of light of the near-infrared spectral range to at least 1000 nm adjacent thereto. The usually employed silicon-based detection devices are suitable for the visually visible spectral range, but not for the spectral range above 1000 nm. It is therefore particularly advantageous to equip the spectral sensor with a detection device which is both configured for the detection of light in the visually visible spectral range and for the near-infrared spectral range up to 1000 nm and above. In particular, the spectral sensor has for this purpose, as a detection device, an InGaAs photodetector which is both configured for the detection of light in the near-infrared spectral range, in particular for the detection of wavelengths above 1000 nm, and also for the detection of light in the visually visible spectral range.

For detecting the remission light, the spectral sensor can also contain several identical detection devices, e.g. in order to capture the remission light over a greater angular range. The spectral sensor can also have several different detection devices, e.g. in order to broaden the spectral range capturable with the spectral sensor. The different detection devices can here be arranged side by side or one behind the other, e.g. in the form of a sandwich structure.

The measured values recorded by the detection device are evaluated by an evaluation device which can be component of the spectral sensor or is formed by an external evaluation device. Preferably, there is effected already by the spectral sensor, in particular by an internal evaluation device of the spectral sensor, at least a preprocessing of the measured values. The further evaluation can be effected also by the internal evaluation device or alternatively by a central evaluation device of the apparatus in which the spectral sensor is installed.

Before the detection device there can be arranged a detection optic, by which the light emanating from the document of value is collected and directed onto a light-sensitive region of the detection device.

The detection optic comprises e.g. one or more refractive or diffractive optical elements or mirrors. The detection optic and the detection device are configured and arranged such that, upon the operation of the spectral sensor, of the light which emanates from the illuminated region there is detected only the light of a document of value's detection region which is arranged completely within the illuminated region. By the detection region being completely arranged within the illuminated region, it is achieved that the detected light intensity is insensitive to flutter motions of the document of value which may occur upon the transport the document of value. The spectral sensor thus also becomes tolerant to any position fluctuations of the illumination device, of the imaging optic, of the detection device or of the detection optic which may arise upon the manufacture or upon assembling the spectral sensor. Preferably, the detection region is arranged completely within a homogeneously illuminated section of the illuminated region. In the homogeneously illuminated section the intensity of the illumination is, preferably for all light pulses of the illumination sequence, homogeneously distributed.

Preferably, for the spectral sensor there is provided a control device which is adapted to successively switch on and off the light sources of the illumination device, in order to successively illuminate the document of value with different emission spectra of the different light sources. The control device can be configured as a component of the spectral sensor, but it can also be configured as an external control device, e.g. as a component of an apparatus for processing documents of value in which the spectral sensor is installed. The control device is adapted to drive the illumination device of the spectral sensor, in particular the light sources, and the detection device of the spectral sensor. Upon the operation of the spectral sensor, the control device successively switches on and off the light sources, for example such that at any point in time exactly one of the light sources is switched on. At one or several of the points in time, however, there can also be simultaneously switched on several of the light sources, e.g. several light sources with the same emission spectrum. Furthermore, the control device initiates that the detection device during the switched-on phase of the light sources captures respectively a measured value which corresponds to the light intensity emanating from the document of value. Since the detection device respectively records one measured value in synchronism with the illumination by the light sources, the light intensity emanating from the value document is thus detected for those wavelengths that are predetermined by the emission spectrum of the respective light source.

Upon the configuration of the spectral sensor there are specified the illumination sequences which are employed for checking the document of value, in particular which of the light sources are switched on and off for the illumination of the document of value. The control device provided for the spectral sensor can already be configured upon the manufacture of the spectral sensor. However, it can be provided that the configuration of the control device is carried out only after the finishing of the spectral sensor. It can further be provided that the configuration of the control device is changeable even after the bringing into service of the spectral sensor. Such a reconfiguration after the bringing into service can be carried out e.g. by the manufacturer of the spectral sensor or by an operator of the spectral sensor or of the apparatus in which the spectral sensor is installed. Upon the reconfiguration it may also be necessary to adjust the driving of the detection device to the driving of the illumination device, e.g. when the number of light sources switched on and off for the measurement is changed. Upon the reconfiguration, also the evaluation device which is employed for evaluating the detected measured values is to be adjusted to the changed configuration of the control device, e.g. when for the check of the document of value other light sources are to be used.

Preferably, the spectral sensor also has a housing, in which there are arranged the illumination device, the imaging optic and the detection device, optionally also the control device and detection optic.

A further aspect of the invention is a method for checking documents of value, which can be carried out with the help of the spectral sensor described above. For checking a document of value, the document of value is transported with a transport speed past the spectral sensor. The document of value is illuminated by an illumination device which has a multiplicity of light sources whose emission spectra are different from each other. The multiplicity of light sources are successively switched on and off upon the illumination of the document of value, in order to illuminate a region of the document of value with an illumination sequence of light pulses with different emission spectra. The light emitted by the illumination device is imaged with the help of an imaging optic onto the illuminated region of the document of value. The light emitted by the light sources is preferably collected with the help of a collection optic which is arranged between the light sources and the imaging optic. The light emanating from the illuminated region of the document of value is detected. In so doing, for each of the light pulses of the illumination sequence there is detected a measured value, in order to record a spectral intensity distribution of the light emanating from the illuminated region. The multiplicity of light sources cover at least a section of the visually visible spectral range and/or of the near-infrared spectral range such that by the detecting of the measured values there is recorded a spectral intensity distribution in the section of the visually visible spectral range and/or of the near-infrared spectral range.

In one embodiment, the illumination device has a light source receiving means, on which there are provided a multiplicity of light source positions, each of which is configured for receiving a light source. The light source positions are arranged side by side on the light source receiving means and are defined by a multiplicity of individual depressions, by which respectively one chip-shaped light source can be received. However, the light source positions can also be defined by elevations and/or by electrical contact areas, which the light source receiving means can have, and which are configured for receiving a chip-shaped light source.

The illumination device of the spectral sensor can have a collection optic. The collection optic is configured e.g. as a microlens array which contains a multiplicity of microlenses. Here, the microlens array and the light source receiving means are arranged to each other such that each of the light sources arranged on the light source receiving means is assigned to exactly one of the microlenses. Upon the operation of the spectral sensor, thus the emission light of each of the light sources is collected by exactly one microlens of the microlens array. By the microlens assigned to the respective light source the emission light of the light sources can be collected with high efficiency. In order to obtain a one-to-one assignment between the microlenses and the light sources, the arrangement of the microlenses in the microlens array and the arrangement of the light sources on the light source receiving means are identical. For example, the microlenses and the light sources are arranged in the same two-dimensional grid. Preferably, the microlens array is configured as a one-pieced body which has fastening means which are integral component of the one-pieced body. The light source receiving means has a counter-piece matching the fastening means of the microlens array.

Employment of the microlens array results in great advantages in comparison to an illumination device wherein a single lens is employed for each light source. For in this case an individual mount would have to be provided for each of the single lenses, and the exact positioning relative to the respective light source ensured upon the fastening of the single lenses. In so doing, it may be necessary that the exact position and/or orientation of the single lenses must be subsequently adjusted. In contrast, upon employment of a microlens array having exactly one microlens for each light source, a single exact positioning is sufficient. This positioning can be effected through the fastening means of the microlens array which are connected to the corresponding counter-pieces of the light source receiving means. The manufacture of the spectral sensor can hence be effected much more simply and without adjustment. In contrast to the realization of a corresponding illumination device with single lenses which must be individually mounted and whose arrangement always leaves interstices, the microlens array moreover involves no or only a minimal interstice between the individual microlenses. Because the microlens array is constructed as a one-pieced body, the microlenses can pass directly into each other. There can hence be obtained by the microlens array quasi an area-covering light collection. By the microlens array there is formed an illumination device which has a high light collection efficiency and is very compact.

DESCRIPTION OF THE DRAWINGS

Hereinafter, the invention will be explained by way of example with reference to the following figures. There are shown:

FIG. 1 a spectral sensor which checks a document of value transported past the spectral sensor, FIG. 2a an example of the emission spectra of the light sources of the illumination device (with normalized intensity), FIG. 2b a temporal sequence of the illumination by several illumination sequences from respectively a multiplicity of light pulses, FIG. 3a a detail of a document of value, on which the illuminated region and the detection region are represented, FIG. 3b-c details of a document of value at the point in time of the first (FIG. 3b) and of the last light pulse (FIG. 3c) of an illumination sequence, whereby the shift of the illuminated region during an illumination sequence is shown, FIG. 4a-b an example of the spectral intensity distributions of two metameric colors, which differ from each other in the red spectral range, and the measured values of a spectral sensor.

DETAILED DESCRIPTION OF PREFERRED EMBODIMENTS

The spectral sensor for checking documents of value is explained in the following by the example of a remission sensor. The spectral sensor according to the invention, however, can also be configured as a transmission sensor. For this purpose, the detection device is arranged opposing the illumination device, so that the illumination light transmitted through the document of value is detected.

Figure 1:
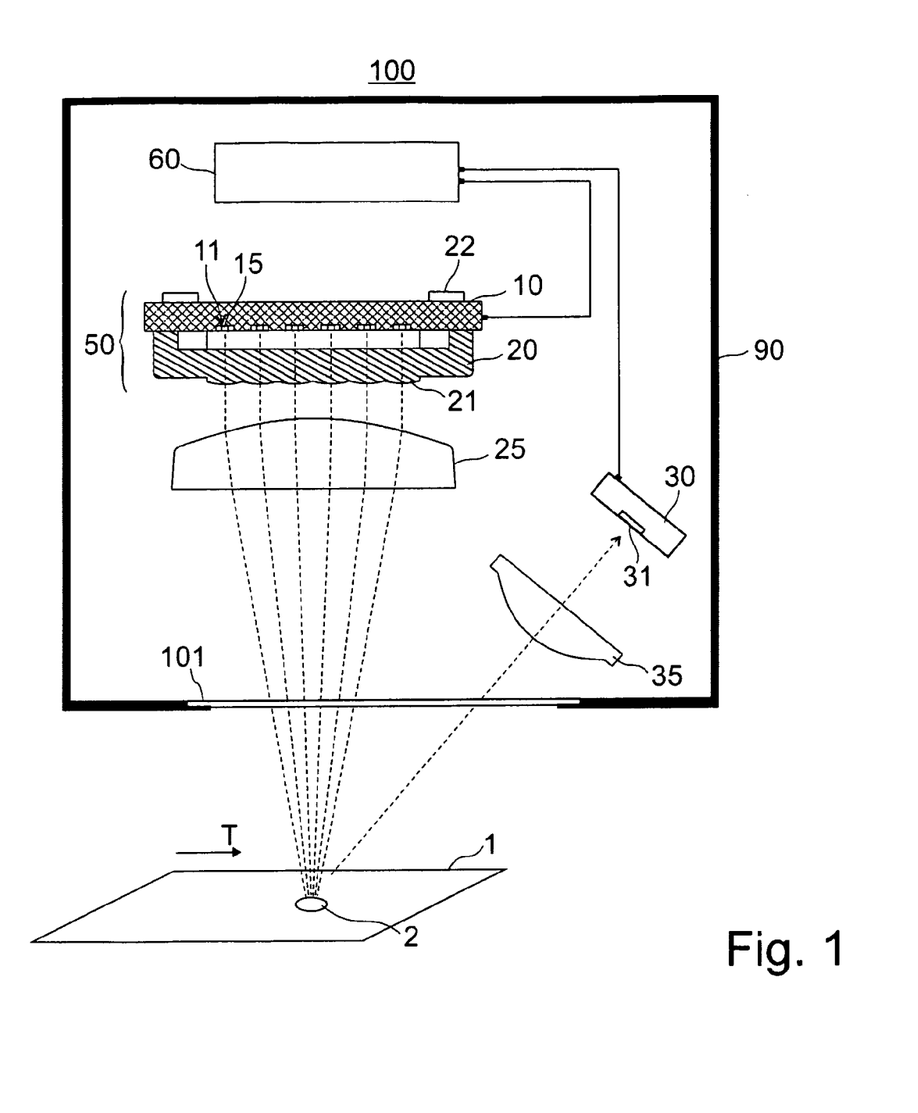

FIG. 1 shows an example of a spectral sensor 100 which is configured for checking documents of value 1 which are transported past the spectral sensor 100. For the illumination of the document of value 1 the spectral sensor 100 has an illumination device 50 which is equipped with a multiplicity of light sources 15 with a multiplicity of different emission spectra. The illumination light emitted by the illumination device 50 is imaged by a collection optic and an imaging lens 25 onto the document of value 1. The collection optic 20 in this example is configured as a microlens array 20. In order to image the light emitted by the illumination device 50 onto the document of value 1, however, as an imaging optic, as an alternative to the imaging lens 25, there can also be employed other optical components, e.g. lens systems, one or several diffractive optical components, e.g. Fresnel lenses or imaging mirrors. By the document of value 1 there are remitted, in dependence on the optical properties of the document of value 1, proportions of the illumination light. The light remitted by the document of value 1 is detected with the help of a detection device 30 which has a light-sensitive region 31. The detection device 30 can be formed e.g. by an InGaAs photodiode or an InGaAs phototransistor. Before the detection device 30 there is arranged a detection optic 35, by which the light remitted by the document of value 1 is collected and directed onto the light-sensitive region 31. In the shown example, the illumination light is perpendicularly imaged onto the document of value 1 and the detection device 30 captures the light remitted at an oblique angle. Alternatively, also the illumination can be effected at an oblique angle and the detection device 30 can capture the light remitted in a perpendicular direction or in an oblique direction.

In the example of FIG. 1, the illumination device 50 comprises a light source receiving means 10, on which a multiplicity of light source positions 11 are provided, each of which is configured for receiving a light source 15. The light source receiving means 10 is configured e.g. as a circuit board and has an electrical wiring structure (not shown) necessary for the operation of the light sources 15, which allows a selective driving of each individual light source 15. The light source positions 11 are formed in this example by depressions in the light source receiving means 10, in which respectively one light source 15 is fastened. For the formation of an illumination device 50, some or all light source positions 11 are respectively provided with a light source 15. As light sources 15 there are used e.g. LEDs and/or OLEDs and/or VCSELs.

The microlens array 20 of the illumination device has a multiplicity of microlenses 21. The light source receiving means 10 and the microlens array are adjusted to each other such that each of the light source positions 11 has assigned thereto exactly one of the microlenses 21. For this purpose, the microlenses 21 are arranged within the microlens array 20 in the same grid as the light source positions 11 are arranged on the light source receiving means 10. The light emitted by the individual light sources 15 is collected by the microlens 21 arranged above the respective light source 15. The microlens array 20 is configured as a one-pieced body and is formed for example by a glass body or by a transparent plastic body. The diameter of the individual microlenses lies e.g. in the μm-range or in the mm-range. For fastening the microlens array 20, the body of the microlens array 20 is equipped with fastening pins 22, which are inserted in holes matching these in the light source receiving means 10. By the fastening of the microlens array 20 by means of the fastening pins 22 there is automatically achieved the optimal position of the microlens array 20 relative to the light sources 15. Upon the manufacture of the spectral sensor 100, thus, no adjustment of the illumination device 50 is necessary.

The spectral sensor 100 has a housing 90, on the lower side of which there is arranged a transparent window 101. The light emitted by the illumination device 50 is directed through the window 101 onto a document of value 1 to be checked, which is transported past the spectral sensor 100 along a transport direction T. The illumination device 50, in particular the light sources 15, and the detection device 30 are driven by a control device 60 which in this example is arranged within the housing 90. The control device 60 successively switches on and off the light sources 15, for example such that at any point in time there is respectively switched on exactly one light source 15. During the switched-on phase of the light sources, the detection device 30 captures respectively a measured value which corresponds to the light intensity remitted by the document of value 1. The document of value 1 is successively illuminated with the different emission spectra of the different light sources 15. Since the detection device 30 respectively detects one measured value in synchronism with the illumination by the light sources 15, for the different emission spectra of the light sources 15 there is detected the light intensity remitted by the document of value 1.

Figure 2A:
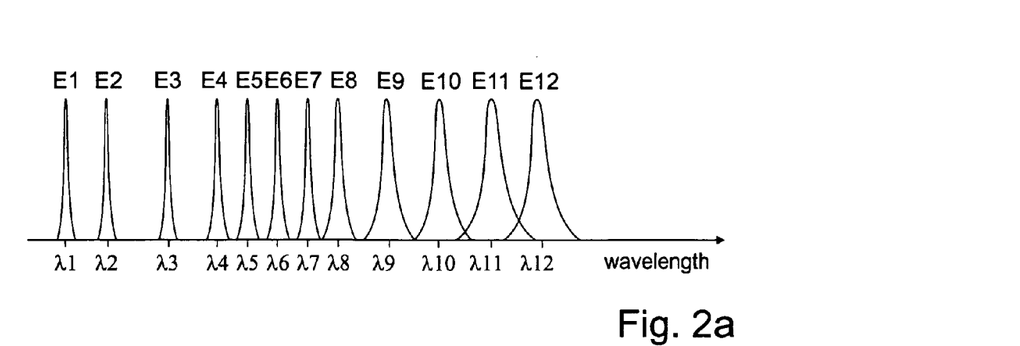

The light sources 15 have a multiplicity of different emission spectra. FIG. 2a shows the emission spectra E1-E12 of the light sources for an example in which the illumination device has twelve light sources 15, whose emission spectra lie partly in the visually visible spectral range and partly in the near-infrared spectral range. In this example, the emission maxima E1-E12 of all twelve light sources 15 lie at different wavelengths λ1-λ12. The spectral distances between the individual emission maxima for λ4-λ8 are in this example respectively less than 60 nm. The emission spectra E10, E11 and E12 of the spectrally mutually adjacent light sources for λ10, λ11 and λ12 spectrally overlap with each other.

Figure 2B:
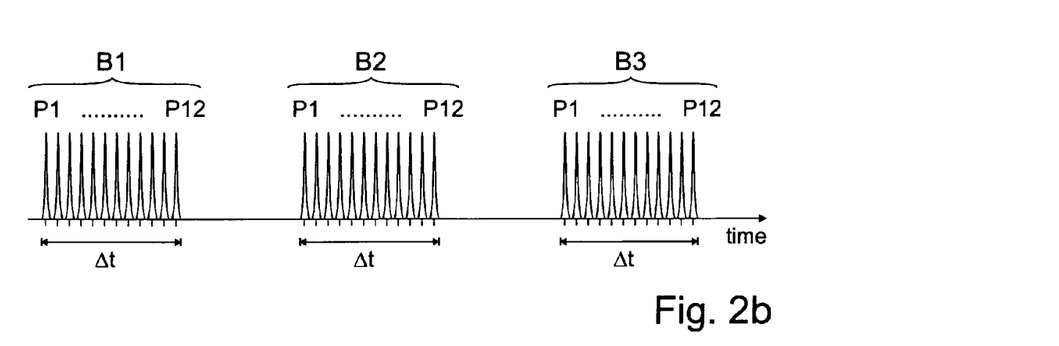

The control device 60 drives the light sources 15 such that the illumination sequence B1, with which the light sources 15 are switched on and off, is periodically repeated. FIG. 2b shows by way of example an illumination sequence B1, which consists of twelve light pulses P1-P12 and is periodically repeated (B2, B3, . . . ). For example, the control device 60 can be so programmed that during each of the illumination sequences B1, B2, B3 each light source 15 of the illumination device 50 is switched on and off exactly once. Alternatively, the same light source 15 can also be driven several times per illumination sequence, e.g. in order to compensate the low intensity of a light source 15 of weak intensity by multiple measurement. An illumination sequence can include either the driving of all light sources 15 present in the illumination device 50 or only of a subset of the light sources 15 present. After the illumination sequence B1, i.e. after there has been recorded, under illumination with each emission spectra E1-E12 provided for the measurement, a measured value, the next illumination sequence B2 starts in which there is recorded, once again under illumination with each emission spectra E1-E12 provided for the measurement, a measured value etc. Between the illumination sequences B1, B2, B3 there can be an illumination pause. The measured values obtained during an illumination sequence deliver the spectral dependence of the remission of the respective document of value's detection region. Optionally, several measured values which are detected in consecutive illumination sequences upon the illumination with the same light source, can be combined to one resulting measured value. Thus, e.g. the measured value which is detected upon the illumination with the first light pulse P1 of the first illumination sequence B1 and the measured value which is detected upon the illumination with the first light pulse P1 of the second illumination sequence B2 can be combined to one resulting measured value.

Figure 3A:
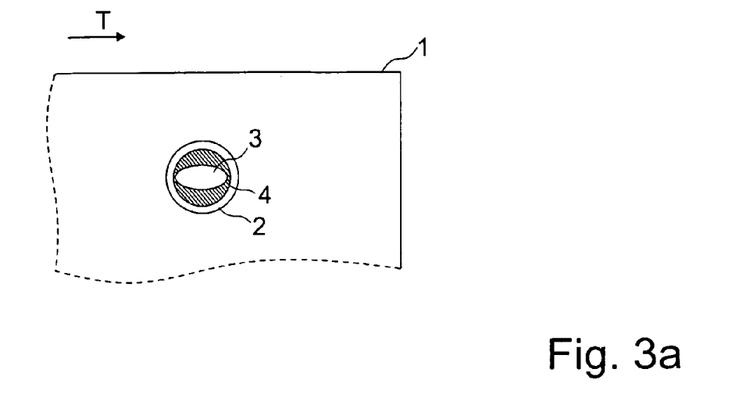

FIG. 3a shows a partial region of the document of value 1 on which there is shown the region 2 illuminated by the illumination device 50. By the light pulses P1-P12 of the illumination sequence B1 a section 4 of the illumination region 2 is respectively illuminated with homogeneous light intensity. There is further shown the detection region 3 which is completely arranged within the homogeneously illuminated section 4 of the illumination region 2.

Figure 3B:
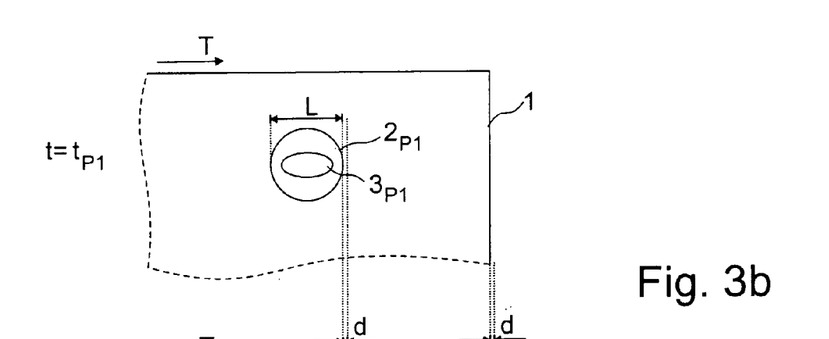
Figure 3C:
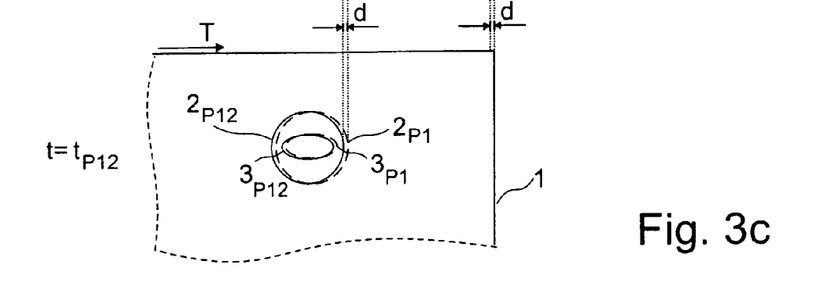

The duration Δt of the illumination sequences B1, B2, B3, . . . is adjusted to the transport speed of the document of value 1 such that through the different measured values of an illumination sequence there is at least approximately detected the remitted light of the same detection region 3 on the document of value 1. For illustration, the FIGS. 3b and 3c show a partial region of the document of value 1 at two different points in time $t_{P1}$ and $t_{P12}$. The homogeneously illuminated section 4 is not drawn in the FIGS. 3b, 3c. At the point in time $t_{P1}$ the document of value 1 is illuminated by the first light pulse P1 of the illumination sequence B1, whereby the region illuminated thereby is referred to as $2_{P1}$ and the associated detection region as $3_{P1}$, cf. FIG. 3b. By transporting the document of value the document of value 1 moves from the point in time $t_{P1}$ to the point in time $t_{P12}$ by a distance d along the transport direction T. At the point in time $t_{P12}$ the document of value 1 is illuminated by the last light pulse $P_{12}$ of the illumination sequence B1, whereby the region illuminated thereby is referred to as $2_{P12}$ and the associated detection region as $3_{P12}$, cf. FIG. 3c. In addition, in FIG. 3c there is once again outlined the region $2_{P1}$ of the document of value 1 illuminated by the first light pulse P1, which is shifted in relation to the illuminated region $2_{P12}$ by the distance d. In comparison to the length L of the illuminated region, however, the distance d is very short. The positions of the illuminated region $2_{P12}$ and of the detection region $3_{P12}$ on the document of value are therefore only slightly shifted in comparison to the positions of the illuminated region $2_{P1}$ and the detection region $3_{P1}$ on the document of value 1. Compared to the length L of the illuminated region, the distance d, which the document of value 1 travels from the beginning until the end of the same illumination sequence, is so short that the two illuminated regions $2_{P1}$ and $2_{P12}$ in terms of superficial area overlap to at least 75%.

Figure 4A:
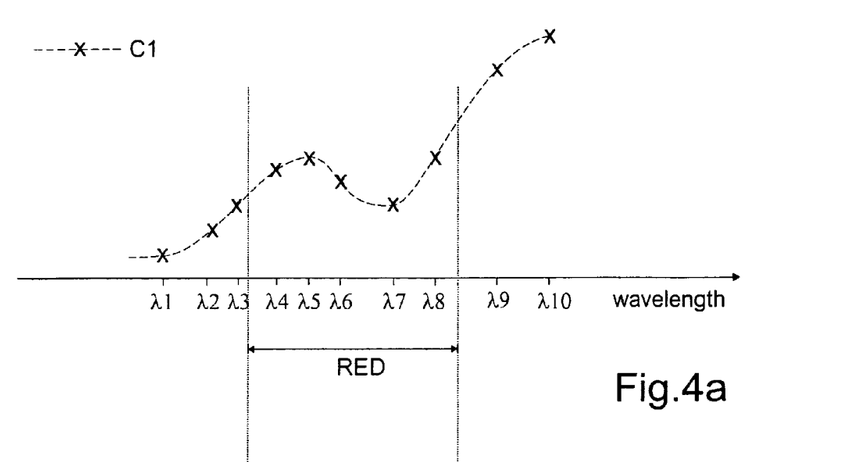
Figure 4B:
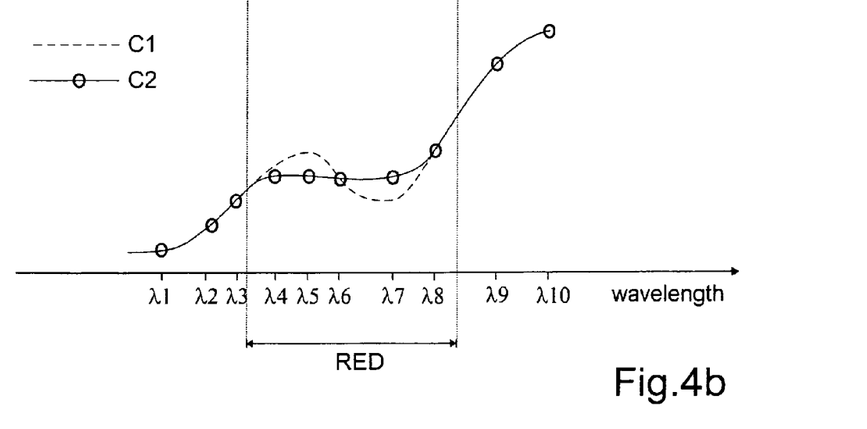

FIG. 4a shows an example of a remission spectrum (dashed line) of a first color C1. The symbols x mark the measured values which a spectral sensor detects upon the recording of the spectral intensity distribution of the first color C1. For recording the spectral intensity distribution, this spectral sensor employs light sources of ten different wavelengths λ1-λ10, of which five lie in the red spectral range (RED) (λ4-λ8). In FIG. 4b there is represented, besides the remission spectrum of the first color C1, also the remission spectrum of a second color C2 (continuous line) as well as the measured values designated with the symbol o, which the spectral sensor detects upon the recording of the spectral intensity distribution of the second color C2. The first color C1 and the second color C2 are colors metameric to each other, whereby the remission spectra thereof differ from each other only in the red spectral range and otherwise extend identically.

Previous RGB sensors can detect remission light in the red spectral range, but they detect the entire red color channel RED in integral fashion. That means there is detected the total intensity of the remission light lying in the red spectral range, independent of its spectral distribution within the red spectral range. An RGB sensor can distinguish two colors from each other only when the two colors differ in their total intensity, which the RGB sensor detects from the respective color in one of its color channels. Since the two remission spectra of the colors C1 and C2, viewed over the red spectral range, have the same area (see FIG. 4b), the RGB sensor, which integrally measures the red spectral range, would detect from the two colors in the red the same total intensity. Therefore, the RGB sensor cannot distinguish the two metameric colors C1 and C2.

The spectral sensor according to the invention, however, can distinguish metameric colors from each other based on the spectral intensity distribution which the spectral sensor records from these colors within one color channel. In the example of FIGS. 4a, b, the spectral sensor can distinguish the two colors C1 and C2 by comparing the spectral intensity distribution within the red spectral range, in particular by comparing the five measured values (x or o) which it detects at the wavelengths λ4 to λ8.

The invention claimed is:

1. A spectral sensor for checking a document of value which, upon the operation of the spectral sensor, is transported with a transport speed past the spectral sensor, comprising:
   an illumination device having a multiplicity of light sources whose emission spectra are different from each other, wherein the multiplicity of light sources, upon the operation of the spectral sensor, are successively switched on and off, to thereby illuminate a region of the document of value with an illumination sequence of light pulses with different emission spectra successively, and an imaging optic by which the light emitted by the illumination device, upon the operation of the spectral sensor, is imaged onto the illuminated region of the document of value, and a detection device that detects light which, upon the operation of the spectral sensor, emanates from the region illuminated with the light pulses of the illumination sequence, wherein for each of the light pulses of the illumination sequence there is detected a measured value which corresponds to an intensity of the detected light, and wherein the multiplicity of light sources cover at least one of a section of the near-infrared spectral range and a section of the visually visible spectral range in such a way that through the detection of the measured values, recording by the spectral sensor of a spectral intensity distribution in at least one of the section of the near-infrared spectral range and in the section of the visually visible spectral range is enabled.

2. The spectral sensor according to claim 1, wherein the light sources are selected such that the spectral sensor records a spectral intensity distribution which extends from the visually visible spectral range up into the near-infrared spectral range.

3. The spectral sensor according to claim 1, wherein the multiplicity of light sources cover at least one of the red spectral range, the green spectral range, the blue spectral range and the near-infrared spectral range of 750 nm to 1000 nm in such a way that metameric colors, which are contained in the illuminated region, are distinguishable from each other based on the spectral intensity distribution which the spectral sensor records upon the detection of the light emanating from the metameric color.

4. The spectral sensor according to claim 1, wherein the multiplicity of light sources cover at least one of the red spectral range, the green spectral range, and the blue spectral range in such a way that in the respective spectral range there lie at least two different emission spectra of the light sources.

5. The spectral sensor according to claim 1, wherein the multiplicity of light sources cover the near-infrared spectral range of 750 nm to 1000 nm and/or the near-infrared spectral range of 1000 nm to 1600 nm in such a way that in the respective spectral range there lie at least three different emission spectra of the light sources.

6. The spectral sensor according to claim 1, wherein the emission spectra of the multiplicity of the light sources comprise at least five different emission spectra in the visually visible spectral range.

7. The spectral sensor according to claim 1, wherein the emission spectra of at least three of the light sources, which are spectrally adjacent to each other, spectrally overlap and/or have emission maxima respectively mutually different, whose spectral distance is no more than 60 nm.

8. The spectral sensor according to claim 1, wherein the illumination device has a collection optic which is arranged between the light sources and the imaging optic, in order to collect the light emitted by the light sources, wherein the collection optic has a multiplicity of lenses arranged side by side, by which the light respectively emitted by one of the light sources are collected.

9. The spectral sensor according to claim 1, wherein the spectral sensor comprises a detection optic, wherein the detection optic and the detection device are configured and arranged in such a way that, upon the operation of the spectral sensor, of the light which emanates from the illuminated region there is detected only light of a detection region of the document of value which is arranged completely within the illuminated region.

10. The spectral sensor according to claim 1, wherein the duration of the illumination sequence is so related to the transport speed of the document of value that all light pulses which are emitted by the light sources during the illumination sequence illuminate almost the same region of the document of value.

11. The spectral sensor according to claim 1, wherein the region on the document of value illuminated by the first light pulse of the illumination sequence and the region on the document of value illuminated by the last light pulse of the same illumination sequence have an overlap of at least 75%.

12. The spectral sensor according to claim 1, wherein the detection device is an InGaAs photodetector which is both configured for the detection of light in the visually visible spectral range and for the detection of light in the near-infrared spectral range.

13. A method for checking documents of value, comprising:

transporting a document of value to be checked with a transport speed past a spectral sensor which is configured for checking the document of value, illuminating the document of value by an illumination device which has a multiplicity of light sources whose emission spectra are different from each other, wherein the multiplicity of light sources, upon the illumination of the document of value, are successively switched on and off, in order to illuminate a region of the document of value with an illumination sequence of light pulses with different emission spectra successively, imaging the light emitted by the illumination device using of an imaging optic onto the illuminated region of the document of value, detecting light emanating from the illuminated region of the document of value, wherein for each of the light pulses of the illumination sequence there is detected a measured value corresponding to the intensity of the detected light, wherein the multiplicity of light sources cover a section of the near-infrared spectral range and/or a section of the visually visible spectral range in such a way that the spectral sensor records, by the detecting of the measured values, a spectral intensity distribution in at least one of the sections of the near-infrared spectral range and the section of the visually visible spectral range.

14. The method according to claim 13, wherein the illumination sequence with which the region is illuminated is periodically repeated.

15. The method according to claim 13, wherein at least two measured values, which are detected upon the illumination by respectively one light pulse of the same light source in different illumination sequences, are combined into one resulting measured value.

* * * * *